US012129805B2

(12) United States Patent
Tabata et al.

(10) Patent No.: US 12,129,805 B2
(45) Date of Patent: Oct. 29, 2024

(54) VEHICLE CONTROLLER, VEHICLE CONTROL METHOD, AND STORAGE MEDIUM

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Masato Nakano, Toyota (JP); Yoshito Sekiguchi, Kariya (JP); Nobuhiko Satake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/324,213

(22) Filed: May 26, 2023

(65) Prior Publication Data

US 2024/0011445 A1 Jan. 11, 2024

(30) Foreign Application Priority Data

Jul. 6, 2022 (JP) ................................ 2022-109161

(51) Int. Cl.
*F02D 19/02* (2006.01)

(52) U.S. Cl.
CPC .... *F02D 19/029* (2013.01); *F02D 2200/0406* (2013.01)

(58) Field of Classification Search
CPC ................ F01M 13/023; F02D 19/029; F02D 2200/0406; F02D 2250/08; F02D 2250/26; F02D 2250/41; F02D 41/0007
See application file for complete search history.

(56) References Cited

U.S. PATENT DOCUMENTS

| | | | | |
|---|---|---|---|---|
| 8,662,057 | B2 * | 3/2014 | Kuroki | F02D 21/08 123/568.11 |
| 9,447,752 | B2 * | 9/2016 | Kuroki | F02D 21/04 |
| 2011/0209691 | A1 * | 9/2011 | Kuroki | F02D 21/04 123/568.21 |
| 2016/0245191 | A1 * | 8/2016 | Saito | F01N 13/107 |
| 2021/0010410 | A1 * | 1/2021 | Tabata | F02B 37/22 |

(Continued)

FOREIGN PATENT DOCUMENTS

| | | | |
|---|---|---|---|
| EP | 2 410 155 | A1 | 1/2012 |
| JP | 2021-127704 | A | 9/2021 |
| JP | 2023-82747 | A | 6/2023 |

*Primary Examiner* — Carl C Staubach
(74) *Attorney, Agent, or Firm* — Oblon, McClelland, Maier & Neustadt, L.L.P.

(57) ABSTRACT

A hydrogen concentration calculating process calculates a hydrogen concentration in a specific portion of a target region based on an operating state of an internal combustion engine. The internal combustion engine uses hydrogen as fuel. A downstream passage is a portion of an intake passage of the internal combustion engine that is downstream of a throttle valve. A connecting passage connects a crank chamber of the internal combustion engine to the downstream passage. The target region is a region including the crank chamber and the connecting passage. When a condition is met, in which the hydrogen concentration is greater than or equal to a predetermined determination value, a pressure reduction process causes a pressure in the downstream passage to be lower than that at a point in time when the condition is met.

11 Claims, 3 Drawing Sheets

(56) References Cited

U.S. PATENT DOCUMENTS

| | | | | |
|---|---|---|---|---|
| 2023/0313750 | A1* | 10/2023 | Li | F01M 13/0011<br>123/41.86 |
| 2024/0011446 | A1* | 1/2024 | Tanaka | F02D 13/0215 |
| 2024/0175402 | A1* | 5/2024 | Tanaka | F02D 23/00 |

* cited by examiner

VEHICLE CONTROLLER, VEHICLE CONTROL METHOD, AND STORAGE MEDIUM

BACKGROUND

1. Field

The present disclosure relates to a vehicle controller, a vehicle control method, and a storage medium.

2. Description of Related Art

Japanese Laid-Open Patent Publication No. 2021-127704 discloses an internal combustion engine using hydrogen as fuel and a controller for the internal combustion engine. The internal combustion engine includes a crank chamber, a ventilation passage, and a ventilation fan. The ventilation passage connects the crank chamber to the outside of the internal combustion engine. The ventilation fan is located in the ventilation passage. Hydrogen gas leaking from the cylinder accumulates in the crank chamber.

The controller drives the ventilation fan when the hydrogen concentration in the crank chamber becomes high. Then, hydrogen gas is discharged from the crank chamber.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a vehicle includes a control circuit. The controller is configured to execute a hydrogen concentration calculating process and a pressure reduction process. The hydrogen concentration calculating process calculates a hydrogen concentration in a specific portion of a target region based on an operating state of an internal combustion engine. The internal combustion engine uses hydrogen as a fuel. A downstream passage is a portion of an intake passage of the internal combustion engine that is downstream of a throttle valve. A connecting passage connects a crank chamber of the internal combustion engine to the downstream passage. The target region is a region including the crank chamber and the connecting passage. The pressure reduction process is a process that, when a condition is met, in which the hydrogen concentration is greater than or equal to a predetermined determination value, causes a pressure in the downstream passage to be lower than that at a point in time when the condition is met.

In the above-described configuration, when the pressure reduction process is executed, the pressure in the downstream passage decreases. When the pressure in the downstream passage decreases, the hydrogen gas accumulated in the crank chamber is discharged to the intake passage through the connecting passage together with other gases. This lowers the hydrogen concentration in the crank chamber. In this manner, the above-described configuration reduces the hydrogen concentration in the crank chamber without providing a ventilation fan.

If a ventilation fan is provided to discharge hydrogen gas as in the technique disclosed in the above-described document, a space is required around the ventilation fan to mount various components related to the ventilation fan on the internal combustion engine. Mounting such various components on the internal combustion engine adds to spatial restrictions when the internal combustion engine is mounted on a vehicle. Therefore, there is a demand for a technique capable of reducing the hydrogen concentration in the crank chamber without providing such a ventilation fan. The above-described configuration provides such a technique.

The control circuit may include a storage device and an execution device. The storage device stores in advance map data defining a map pre-trained through machine learning. The map outputs a variable indicating the hydrogen concentration as an output variable when multiple input variables are input to the map. The map includes, as one of the input variables, a variable indicating a pressure in the downstream passage. The execution device is configured to execute the following as the hydrogen concentration calculating process: an obtaining process that obtains values of the input variables; and a calculating process that calculates a value of the output variable by inputting the values of the input variables, which are obtained by the obtaining process, to the map.

Other aspects of the present disclosure provide a vehicle control method and a non-transitory computer readable medium that have features similar to those of the vehicle controller.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for a vehicle 90 according to a first embodiment of the present disclosure will now be described with reference to FIGS. 1, 3, and 4.

<Overall Configuration of Vehicle>

Figure 1:
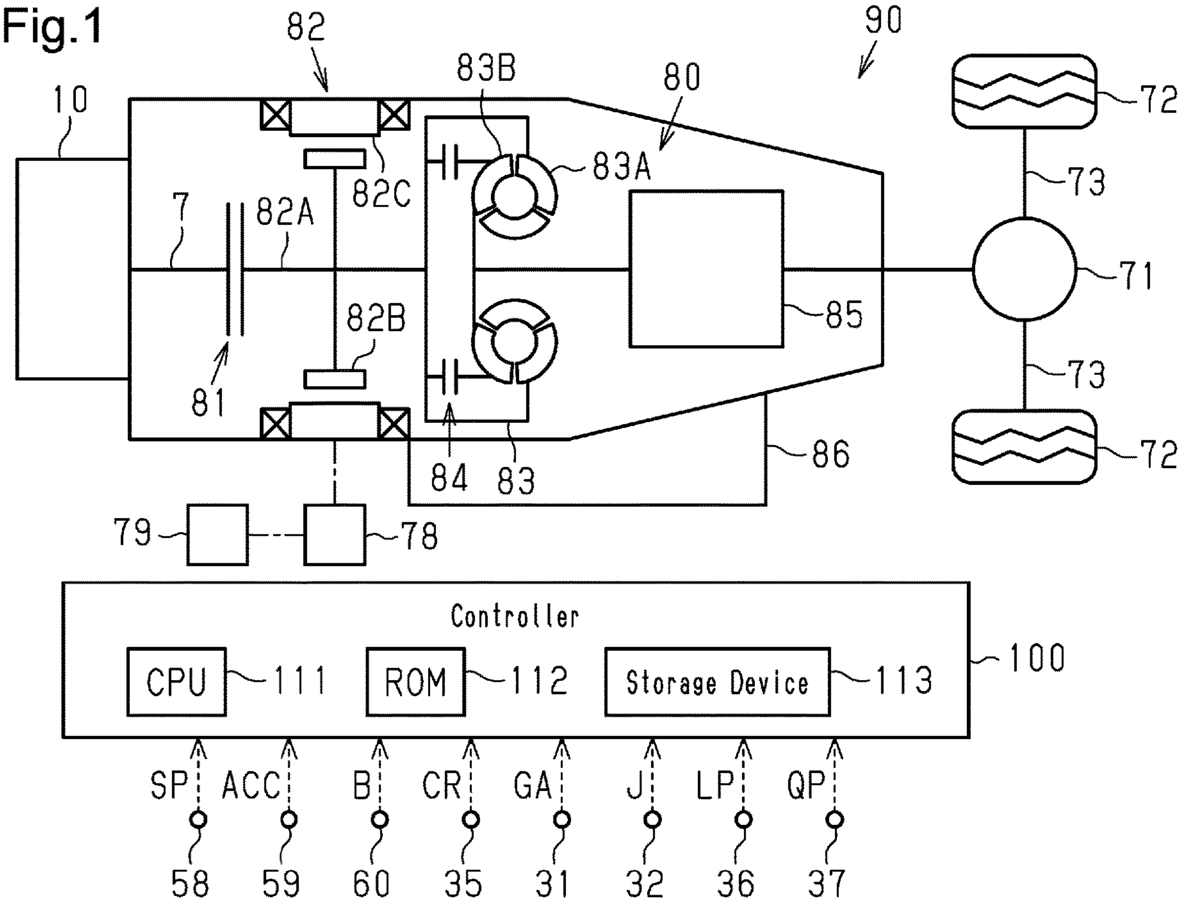
FIG. 1 is a schematic diagram showing a configuration of a vehicle according to a first embodiment of the present disclosure.

As shown in FIG. 1, the vehicle 90 includes an internal combustion engine 10, a drive clutch 81, a motor-generator 82, a transmission unit 80, a hydraulic mechanism 86, a differential 71, axles 73, drive wheels 72, an inverter 78, and a battery 79.

The internal combustion engine 10 is a drive source of the vehicle 90. The details of the internal combustion engine 10 will be discussed below. The internal combustion engine 10 includes a crankshaft 7.

The motor-generator 82 is a drive source of the vehicle 90. The motor-generator 82 functions as both an electric motor and a generator. The motor-generator 82 includes a stator 82C, a rotor 82B, and a rotary shaft 82A. The rotor 82B is rotatable relative to the stator 82C. The rotary shaft 82A rotates integrally with the rotor 82B. The motor-generator 82 is electrically connected to the battery 79 via the inverter 78. The battery 79 transmits and receives electric power to and from the motor-generator 82. The inverter 78 performs conversion between direct current and alternating current.

The drive clutch 81 is interposed between the internal combustion engine 10 and the motor-generator 82. The drive clutch 81 is engaged or disengaged in accordance with the hydraulic pressure from the hydraulic mechanism 86. When engaged, the drive clutch 81 connects the crankshaft 7 to the rotary shaft 82A of the motor-generator 82. When disengaged, the drive clutch 81 disconnects the crankshaft 7 from the rotary shaft 82A of the motor-generator 82. When the drive clutch 81 is engaged, the motor-generator 82 can apply torque to the crankshaft 7.

The transmission unit 80 includes a torque converter 83 and an automatic transmission 85. The torque converter 83 includes a pump impeller 83A, a turbine 83B, and a lock-up clutch 84. The torque converter 83 is a fluid coupling having a torque amplifying function. The pump impeller 83A rotates integrally with the rotary shaft 82A of the motor-generator 82. The turbine 83B rotates integrally with an input shaft of the automatic transmission 85. The lock-up clutch 84 is engaged or disengaged in accordance with the hydraulic pressure from the hydraulic mechanism 86. When engaged, the lock-up clutch 84 connects the pump impeller 83A to the turbine 83B. When disengaged, the lock-up clutch 84 disconnects the pump impeller 83A from the turbine 83B.

The automatic transmission 85 is a multi-stage transmission, which changes the gear ratio in multiple stages through gear shifting. The gear is shifted in accordance with the hydraulic pressure from the hydraulic mechanism 86. An output shaft of the automatic transmission 85 is connected to the left and right axles 73 via the differential 71. The axles 73 transmit the driving force to the drive wheel 72. The differential 71 allows for a difference in rotation speed between the left and right axles 73. The drive clutch 81, the motor-generator 82, and the transmission unit 80 are accommodated in a single case. In the above-described power transmission system, the internal combustion engine 10 and the motor-generator 82 can apply torque to the axles 73 and then to the drive wheels 72 via the transmission unit 80.

The vehicle 90 includes a vehicle speed sensor 58, an accelerator sensor 59, and a battery sensor 60. The vehicle speed sensor 58 detects a traveling speed of the vehicle 90 as a vehicle speed SP. The accelerator sensor 59 detects a depression amount of the accelerator pedal of the vehicle 90 as an accelerator operation amount ACC. The battery sensor 60 detects battery information B such as a current, a voltage, and a temperature of the battery 79. Each of the above-described sensors repeatedly transmits a signal corresponding to information detected by itself to the controller 100, which will be discussed below.

<Overall Configuration of Internal Combustion Engine>

Figure 3:
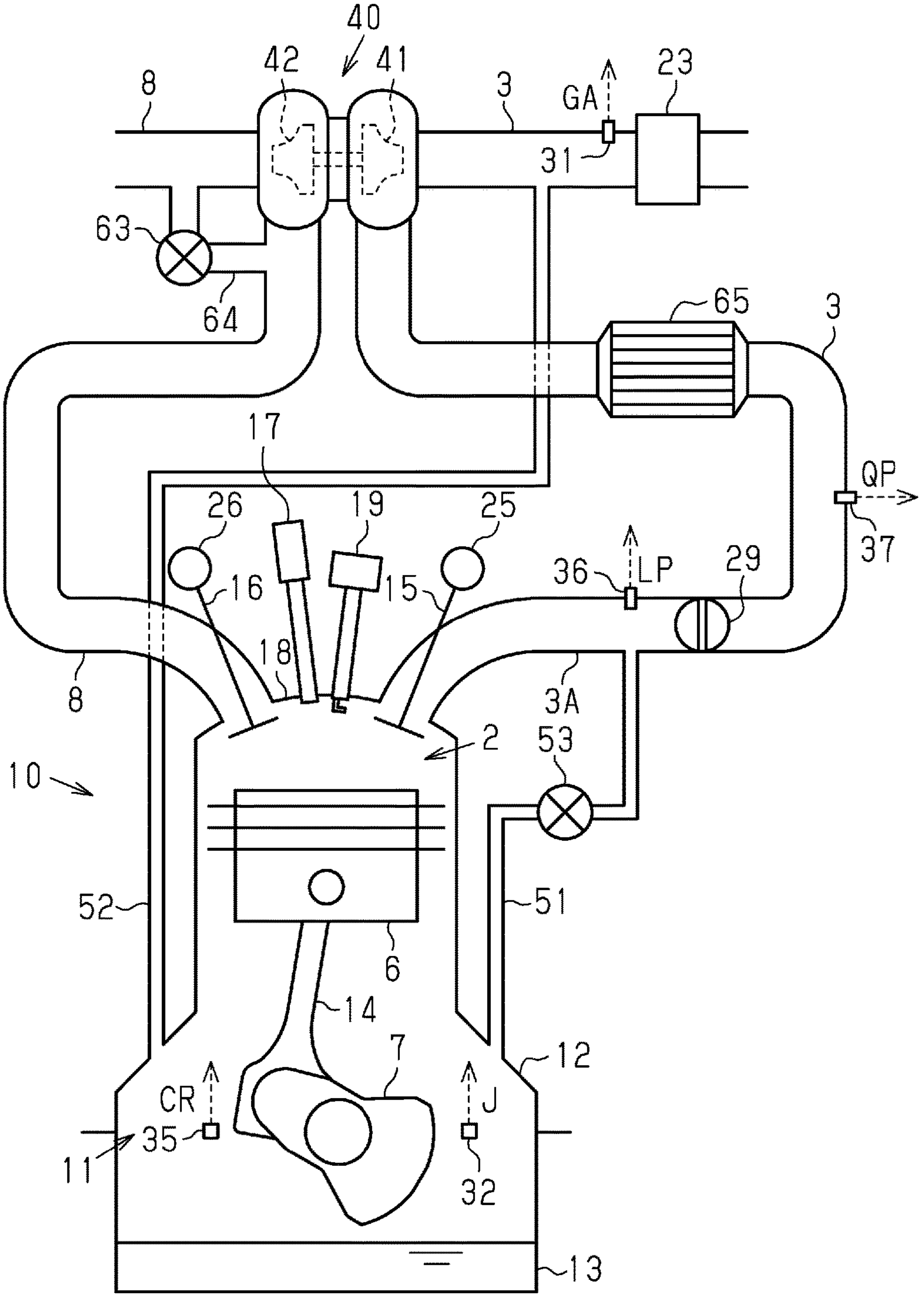
FIG. 3 is a schematic diagram showing a configuration of an internal combustion engine mounted on the vehicle shown in FIG. 1.

As shown in FIG. 3, the internal combustion engine 10 includes an oil pan 13, a cylinder block 12, a cylinder head 18, and a cylinder head cover. The cylinder head cover is omitted in the drawings. The oil pan 13 stores oil. The cylinder block 12 is located above the oil pan 13. The cylinder head 18 is located above the cylinder block 12. The cylinder head cover covers the cylinder head 18 from above. A lower portion of the cylinder block 12 will be referred to as a crankcase in some cases.

The internal combustion engine 10 includes cylinders 2, pistons 6, connecting rods 14, a crank chamber 11, and a crankshaft 7. FIG. 3 illustrates only one of the cylinders 2. The same applies to the pistons 6 and the connecting rods 14. The number of cylinders 2 is four. The cylinders 2 are spaces defined in the cylinder block 12. In each cylinder 2, an air-fuel mixture of intake air and fuel is burned. The crank chamber 11 is located below the cylinders 2. The crank chamber 11 is a space defined by a lower portion of the cylinder block 12 and the oil pan 13. The crank chamber 11 is connected to each cylinder 2. The crank chamber 11 accommodates the crankshaft 7. The pistons 6 are provided for the respective cylinders 2. Each piston 6 is located in the corresponding cylinder 2. The piston 6 reciprocates in the cylinder 2. The piston 6 is connected to the crankshaft 7 via the corresponding connecting rod 14. The crankshaft 7 rotates in response to operation of the pistons 6.

The internal combustion engine 10 includes ignition plugs 19 and fuel injection valves 17. FIG. 3 illustrates only one of the ignition plugs 19. The same applies to the fuel injection valves 17. The ignition plugs 19 are provided for the respective cylinders 2. The ignition plugs 19 are attached to the cylinder head 18. The tip of each ignition plug 19 is located inside the corresponding cylinder 2. The ignition plug 19 ignites air-fuel mixture in the cylinder 2. The fuel injection valves 17 are provided for the respective cylinders 2. The fuel injection valves 17 are attached to the cylinder head 18. The tip of each fuel injection valve 17 is located inside the corresponding cylinder 2. The fuel injection valves 17 directly inject fuel into the cylinders 2 without causing the fuel to pass through an intake passage 3, which will be discussed below. The fuel injection valves 17 inject hydrogen as fuel.

The internal combustion engine 10 includes the intake passage 3, an air cleaner 23, an intercooler 65, and a throttle valve 29. The intake passage 3 conducts intake air to the cylinders 2. The intake passage 3 is connected to the cylinders 2. The air cleaner 23 filters intake air taken into the intake passage 3. The intercooler 65 is located on the downstream side of the air cleaner 23 in the intake passage 3. The intercooler 65 cools the intake air. The throttle valve 29 is located on the downstream side of the intercooler 65 in the intake passage 3. The opening degree of the throttle valve 29 can be adjusted. An intake air amount GA is changed in accordance with an opening degree of the throttle valve 29 (hereinafter, referred to as a throttle opening degree). The throttle opening degree is changed by an electric motor.

The internal combustion engine 10 includes an exhaust passage 8. The exhaust passage 8 discharges exhaust gas from the cylinders 2. The exhaust passage 8 is connected to the cylinders 2.

The internal combustion engine 10 includes intake valves 15, an intake valve actuation mechanism 25, exhaust valves 16, and an exhaust valve actuation mechanism 26. FIG. 3 illustrates only one of the intake valves 15. The same applies to the exhaust valves 16. The intake valves 15 are provided for the respective cylinders 2. The intake valves 15 are located at connection ports of the intake passage 3 that are connected to the cylinders 2. The intake valve actuation mechanism 25 includes an intake camshaft and a variable intake valve device. The intake valve 15 opens and closes the connection port of the intake passage 3 in accordance with operation of the intake camshaft. The variable intake valve device changes the opening/closing timing of the intake valves 15. The exhaust valves 16 are provided for the respective cylinders 2. The exhaust valves 16 are located at connection ports of the exhaust passage 8 that are connected to the cylinders 2. The exhaust valve actuation mechanism 26 includes an exhaust camshaft and a variable exhaust valve device. The exhaust valve 16 opens and closes the connection port of the exhaust passage 8 in accordance with operation of the exhaust camshaft. The variable exhaust valve device changes the opening/closing timing of the exhaust valves 16.

The internal combustion engine 10 includes a forced-induction device 40. The forced-induction device 40 is provided across the intake passage 3 and the exhaust passage 8. The forced-induction device 40 includes a compressor wheel 41 and a turbine wheel 42. The compressor wheel 41 is located between the air cleaner 23 and the intercooler 65 in the intake passage 3. The turbine wheel 42 is located in the exhaust passage 8. The turbine wheel 42 rotates in response to the flow of the exhaust gas. The compressor wheel 41 rotates integrally with the turbine wheel 42. At this time, the compressor wheel 41 compresses and delivers the intake air. That is, the compressor wheel 41 performs forced induction of intake air.

The forced-induction device 40 includes a bypass passage 64 and a wastegate valve (hereinafter, referred to as a WGV) 63. The bypass passage 64 connects a section of the exhaust passage 8 that is on the upstream side of the turbine wheel 42 to a section on the downstream side of the turbine wheel 42. That is, the bypass passage 64 is a passage bypassing the turbine wheel 42. The WGV 63 is located at the downstream end of the bypass passage 64. For illustrative purposes, the WGV 63 is shown in the middle of the bypass passage 64 in FIG. 3. The opening degree of the WGV 63 can be adjusted by an actuator. As the opening degree of the WGV 63 increases, the amount of exhaust gas that bypasses the turbine wheel 42 and flows through the bypass passage 64 increases. At the same time, the rotation speed of the turbine wheel 42 and the compressor wheel 41 decreases. Along with this, a boost pressure QP, which is the pressure of the gas on the downstream side of the compressor wheel 41 in the intake passage 3 decreases. When the WGV 63 is fully opened, forced induction by the compressor wheel 41 is stopped.

The internal combustion engine 10 includes a blow-by gas treatment mechanism for returning blow-by gas in the crank chamber 11 to the intake passage 3. The blow-by gas is gas leaking from the cylinders 2 in the compression stroke or combustion stroke to the crank chamber 11. The blow-by gas treatment mechanism includes a first connecting passage 51, a second connecting passage 52, and a positive crankcase ventilation (PCV) valve 53. A section of the intake passage 3 that is on the downstream side of the throttle valve 29 is referred to as a downstream passage 3A. The first connecting passage 51 extends from the crank chamber 11 to the downstream passage 3A. The second connecting passage 52 extends from the crank chamber 11 to a section of the intake passage 3 that is on the upstream portion of the compressor wheel 41. The PCV valve 53 is located in the first connecting passage 51. The PCV valve 53 is a differential pressure regulating valve. The PCV valve 53 opens when the pressure LP of the gas in the downstream passage 3A (hereinafter, referred to as a downstream pressure) becomes lower than the pressure of the gas in the crank chamber 11 (hereinafter, referred to as a pressure in the crank chamber 11). When the PCV valve 53 is opened, blow-by gas is allowed to flow from the crank chamber 11 to the downstream passage 3A.

For example, when the boost pressure QP of the intake air generated by the compressor wheel 41 is relatively low or when forced induction by the compressor wheel 41 is not performed, the downstream pressure LP in the downstream passage 3A is lower than the pressure RP in the crank chamber 11 (LP<RP). In this case, if the PCV valve 53 is opened as described above, the blow-by gas in the crank chamber 11 is discharged to the downstream passage 3A via the first connecting passage 51. On the other hand, for example, when the boost pressure QP is relatively high, the relationship between the downstream pressure LP and the pressure RP in the crank chamber 11 reverses from that in the above-described case (i.e., LP≥RP), so that the PCV valve 53 is closed. In this case, the blow-by gas in the crank chamber 11 is discharged to the intake passage 3 through the second connecting passage 52. However, the amount of blow-by gas discharged at this time is limited.

The internal combustion engine 10 includes a crank position sensor 35, a concentration sensor 32, an air flow meter 31, a boost pressure sensor 37, and an intake pressure sensor 36. The crank position sensor 35 is located near the crankshaft 7. The crank position sensor 35 detects a rotational position CR of the crankshaft 7. The concentration sensor 32 is attached to the crank chamber 11. The concentration sensor 32 detects a hydrogen concentration J, which is a concentration of hydrogen gas in the crank chamber 11. Specifically, the hydrogen concentration J is the content [%] of hydrogen gas in the crank chamber 11. The air flow meter 31 is located between the air cleaner 23 and the compressor wheel 41 in the intake passage 3. The air flow meter 31 detects the intake air amount GA. The boost pressure sensor 37 is located between the intercooler 65 and the throttle valve 29 in the intake passage 3. The boost pressure sensor 37 detects the boost pressure QP described above. The intake pressure sensor 36 is located in the downstream passage 3A. The intake pressure sensor 36 detects the downstream pressure LP described above. Each of these sensors repeatedly transmits a signal corresponding to information detected by itself to the controller 100, which will be discussed below.

<Overall Configuration of Controller>

As shown in FIG. 1, the vehicle 90 includes the controller 100. The controller 100 may include a control circuit including one or more processors that perform various processes according to computer programs (software). The controller 100 may be circuitry including one or more dedicated hardware circuits such as application specific integrated circuits (ASICs) that execute at least part of various processes, or a combination thereof. The processor includes a CPU 111 and a memory such as a RAM and a ROM 112. The memory stores program codes or instructions configured to cause the CPU 111 to execute processes. The memory, which is a computer-readable medium, includes any type of media that are accessible by general-purpose computers and dedicated computers. The CPU 111 and the ROM 112 are included in an execution device. The CPU 111 has a time measuring function. The controller 100 includes a storage device 113, which is a nonvolatile memory that can be electrically rewritten.

The controller 100 repeatedly receives detection signals from various sensors mounted on the vehicle 90. Specifically, the controller 100 receives detection signals for the following parameters:

- the rotational position CR of the crankshaft 7 detected by the crank position sensor 35;
- the hydrogen concentration J detected by the concentration sensor 32;
- the intake air amount GA detected by the air flow meter 31;
- the downstream pressure LP detected by the intake pressure sensor 36;
- the boost pressure QP detected by the boost pressure sensor 37;
- the vehicle speed SP detected by the vehicle speed sensor 58;
- the accelerator operation amount ACC detected by the accelerator sensor 59; and
- the battery information B detected by the battery sensor 60.

The CPU 111 constantly calculates the following parameters based on the detection signals received from the various sensors. Based on the rotational position CR of the crankshaft 7, the CPU 111 calculates an engine rotation speed NE, which is the rotation speed of the crankshaft 7. Further, the CPU 111 calculates an engine load factor KL based on the engine rotation speed NE and the intake air amount GA. The engine load factor KL is a parameter that determines the amount of air with which the cylinders 2 are charged. The engine load factor KL is obtained by dividing the amount of air flowing into one cylinder 2 per combustion cycle by a reference air amount. The reference air amount changes in accordance with the engine rotation speed NE. One combustion cycle is a continuous period of time in which one cylinder 2 undergoes an intake stroke, a compression stroke, an expansion stroke, and an exhaust stroke. The CPU 111 calculates a state of charge of the battery 79 based on the battery information B. The state of charge of the battery 79 is a value obtained by dividing the remaining power of the battery 79 by the full charge capacity of the battery 79.

Based on the accelerator operation amount ACC, the vehicle speed SP, and the like, the CPU 111 calculates a required driving force, which is a required value of the driving force necessary for the vehicle 90 to travel. Based on the required driving force, the CPU 111 calculates an engine target torque, which is a target torque of the internal combustion engine 10, and a motor target torque, which is a target torque of the motor-generator 82. Then, the CPU 111 controls the internal combustion engine 10 and the motor-generator 82 based on the respective calculated target torques. Further, the CPU 111 controls the automatic transmission 85, the drive clutch 81, and the lock-up clutch 84 in accordance with the traveling state of the vehicle 90. Specifically, the CPU 111 switches the gear ratio of the automatic transmission 85, switches the engaged/disengaged state of the drive clutch 81, and switches the engaged/disengaged state of the lock-up clutch 84. At this time, the CPU 111 adjusts the hydraulic pressure for each control target by controlling the hydraulic mechanism 86. As described above, the CPU 111 controls various parts of the vehicle 90.

When controlling the internal combustion engine 10, the CPU 111 sets control target values for various parts of the internal combustion engine 10 based on the engine rotation speed NE, the engine load factor KL, and the like, in addition to the engine target torque. The CPU 111 controls various parts of the internal combustion engine 10 based on the control target values. For example, the CPU 111 adjusts the throttle opening degree to match a target opening degree, causes the fuel injection valves 17 to inject a target injection amount of fuel, and causes the ignition plugs 19 to perform ignition at a target ignition timing. The CPU 111 burns the air-fuel mixture in each of the cylinders 2 by fuel injection from the fuel injection valve 17 and ignition by the ignition plug 19. Further, the CPU 111 adjusts the opening degree of the WGV 63 such that the boost pressure QP of the intake air generated by the compressor wheel 41 becomes a target boost pressure, and drives the variable intake valve device such that the opening and closing timing of the intake valve 15 agrees with the target timing. When performing forced induction of intake air, the CPU 111 maximizes the throttle opening degree. The following description will omit detailed descriptions about how CPU 111 sets each control target value during the execution of various processes.

The CPU 111 controls various parts of the vehicle 90 while switching the drive mode of the vehicle 90 between the hybrid mode and the electric mode depending on the situation. In the electric mode, the CPU 111 stops the internal combustion engine 10 and drives the motor-generator 82. That is, in the electric mode, the CPU 111 uses only the motor-generator 82 as a drive source. The electric mode includes a normal electric mode, in which the drive clutch 81 is disengaged, and a motoring mode, in which the drive clutch 81 is engaged. The motoring mode is dedicated to the avoidance process, which will be discussed below. On the other hand, in the hybrid mode, the CPU 111 not only drives both the internal combustion engine 10 and the motor-generator 82, but also engages the drive clutch 81. In the hybrid mode, the CPU 111 uses both the internal combustion engine 10 and the motor-generator 82 as drive sources. In the hybrid mode, the CPU 111 may cause the motor-generator 82 to perform regenerative power generation using the driving force of the internal combustion engine 10. In both the electric mode and the hybrid mode, the CPU 111 continues engaging the lock-up clutch 84 while the vehicle 90 is traveling.

The CPU 111, for example, chooses the electric mode when there is a sufficient margin in the state of charge of the battery 79 (when the state of charge is relatively high) or when the required driving force is relatively small. On the other hand, the CPU 111 chooses the hybrid mode when the required driving force is relatively large. Examples of the case in which the required driving force is relatively small include a case in which the vehicle 90 starts to move and a case in which the vehicle 90 travels under a light load with a small forward acceleration. As described above, there are two types of the electric mode, the normal electric mode and the motoring mode. The required driving force serving as a threshold for switching between the hybrid mode and the normal electric mode is referred to as a normal threshold. The required driving force serving as a threshold for switching between the hybrid mode and the motoring mode is referred to as a motoring threshold. The motoring threshold is determined in advance through, for example, experiments or simulations as a value greater than the minimum value of the required driving force at which forced induction needs to be performed in the internal combustion engine 10. The ROM 112 stores the normal threshold and the motoring threshold in advance. As described above, the motoring mode is dedicated to the avoidance process. Therefore, the CPU 111 does not refer to the motoring threshold for switching between the hybrid mode and the electric mode except during execution of the avoidance process.

<Outline of Avoidance Process>

In the internal combustion engine 10, for example, when the boost pressure QP of the intake air is relatively high, the downstream pressure LP tends to increase. In this case, since the PCV valve 53 is closed, it is difficult to discharge the blow-by gas from the crank chamber 11 to the downstream passage 3A via the first connecting passage 51. Accordingly, the hydrogen gas contained in the blow-by gas tends to accumulate in the crank chamber 11. If the hydrogen gas continues to accumulate in the crank chamber 11, the hydrogen concentration J in the crank chamber 11 may increase to such an extent that hydrogen can be ignited. Even when the boost pressure QP is relatively low or when the throttle valve 29 is nearly fully opened while forced induction is not being performed, the hydrogen concentration J in the crank chamber 11 may increase depending on the situation. The CPU 111 can execute the avoidance process as a process for avoiding an increase in the hydrogen concentration J in the crank chamber 11. The CPU 111 implements each process of the avoidance process by executing programs stored in the ROM 112.

The CPU 111 can execute a hydrogen concentration calculating process as part of the avoidance process. In the hydrogen concentration calculating process, the CPU 111 calculates the current hydrogen concentration J in the crank chamber 11. The hydrogen concentration J in the crank chamber 11 is associated with various parameters representing the operating state of the internal combustion engine 10, such as the fuel injection amount, the downstream pressure LP, and the pressure RP in the crank chamber 11. Therefore, the hydrogen concentration J, which is associated with these parameters, is also one of the parameters representing the operating state of the internal combustion engine 10. In the present embodiment, the CPU 111 calculates the current value of the hydrogen concentration J, which is a parameter representing the operating state of the internal combustion engine 10, based on the detection signal of the concentration sensor 32, which detects the hydrogen concentration J.

The CPU 111 can execute a pressure reduction process as part of the avoidance process. The CPU 111 executes the pressure reduction process when a specific condition is met. In the present embodiment, the specific condition refers to a situation in which all of the following three items (N1), (N2), and (N3) are met.

(N1) The current hydrogen concentration J in the crank chamber 11 is greater than or equal to a determination value JS (J≥JS).

(N2) The vehicle 90 is traveling in the hybrid mode.

(N3) The state of charge of the battery 79 is greater than or equal to a specified state of charge.

The determination value JS is a value lower than the lower limit value of the combustible concentration range of hydrogen gas. The determination value JS is determined in advance through, for example, experiments or simulations as the hydrogen concentration J that needs to be reduced before the hydrogen concentration J increases to the lower limit value. As will be discussed below, when the pressure reduction process and the subsequent series of processes are performed, the output of the internal combustion engine 10 is reduced. The CPU 111 compensates for the reduction in output with the motor-generator 82. The specified state of charge is determined in advance through, for example, experiments or simulations as a value at which the state of charge of the battery 79 does not fall below an allowable lower limit value even when the motor-generator 82 covers the amount of reduction in the output of the internal combustion engine 10 caused by the series of processes. The ROM 112 stores the specific condition including the determination value JS and the specified state of charge in advance.

In the pressure reduction process, the CPU 111 causes the downstream pressure LP to be lower than that at a point in time when the specific condition is met. The CPU 111 can execute any one of two processes having different contents as the pressure reduction process. That is, the CPU 111 executes a first reduction process or a second reduction process as the pressure reduction process.

When the drive mode of the vehicle 90 can be switched to the motoring mode at the point in time when the specific condition is met, the CPU 111 executes the first reduction process as the pressure reduction process. The first reduction process is substantially a process of switching the drive mode of the vehicle 90 from the hybrid mode to the motoring mode. As described above, the motoring mode is a type of the electric mode. In the motoring mode of the present embodiment, the throttle opening degree in the internal combustion engine 10 is set to a unique value. Specifically, in the motoring mode, the throttle opening degree is set to a first opening degree V1, which will be discussed below. The situation in which the first reduction process is executed is a situation in which the throttle opening degree is close to the fully open state with forced induction not being performed in the internal combustion engine 10, or a situation in which the throttle opening degree is the fully open state during forced induction of the internal combustion engine 10.

In the first reduction process, the CPU 111 performs the following while maintaining the drive clutch 81 in the engaged state. The CPU 111 stops combustion of air-fuel mixture in the internal combustion engine 10 while driving the motor-generator 82 according to the required driving force. When the drive clutch 81 is maintained in the engaged state, the torque of the motor-generator 82 is applied to the crankshaft 7, so that the crankshaft 7 rotates. Further, in the first reduction process, the CPU 111 reduces the throttle opening degree, which is currently at the fully open state or at an opening degree close to the fully open state, to the first opening degree V1. With regard to the throttle opening degree, an opening degree that is exactly halfway between the fully closed state and the fully open state is referred to as an intermediate opening degree. The first opening degree V1 is an opening degree between the intermediate opening degree and the fully closed state. The first opening degree V1 is determined in advance through, for example, experiments or simulations as a value at which the downstream pressure LP can be made considerably lower than the pressure RP in the crank chamber 11, so that the blow-by gas can be quickly discharged through the first connecting passage 51. The ROM 112 stores the first opening degree V1 in advance.

When the drive mode of the vehicle 90 cannot be switched to the motoring mode at the point in time when the specific condition is met, the CPU 111 executes the second reduction process as the pressure reduction process. The CPU 111 executes an increase process in conjunction with the second reduction process. The second reduction process and the increase process are processes for switching the control in the hybrid mode from a normal control to a limit control. In the normal control, the torque of the internal combustion engine 10 is not limited. The limit control prohibits forced induction of the internal combustion engine 10, sets the upper limit opening degree of the throttle valve 29 to a second opening degree V2, which will be discussed below, and then controls the internal combustion engine 10 and the motor-generator 82 to generate the required driving force. In the limit control, the torque of the internal combustion engine 10 is limited. Accordingly, the torque of the motor-generator 82 is larger than that in the normal control for the same required driving force. In the setting of the motoring threshold, the situation in which the second reduction process is executed is a situation in which the internal combustion engine 10 is performing forced induction. That is, the throttle opening degree is the fully open state.

In the second reduction process, the CPU 111 not only stops forced induction of intake air by the compressor wheel 41, but also reduces the throttle opening degree in the fully open state to the second opening degree V2. The second opening degree V2 is an opening degree between the intermediate opening degree and the fully open state. That is, in the present embodiment, the expression V1<V2 is satisfied. Specifically, the following expression is satisfied: the fully closed state<V1<the intermediate opening degree<V2<the fully open state. The second opening degree V2 is determined in advance through, for example, experiments or simulations as an opening degree at which the downstream pressure LP can be made lower than the pressure RP in the crank chamber 11 while the torque of the internal combustion engine 10 is maintained. The ROM 112 stores the second opening degree V2 in advance.

In the increase process, the CPU 111 causes the torque of the motor-generator 82 to be greater than that at the point in time when the specific condition is met. Thus, the CPU 111 increases the torque input from the motor-generator 82 to the axles 73. Then, the CPU 111 maintains the total torque input to the axles 73 from both the internal combustion engine 10 and the motor-generator 82 to be the same as that at the point in time when the specific condition is met. The ROM 112 stores multiple torque maps in advance as information used in the increase process. The torque maps will now be described. It is now assumed that forced induction of the internal combustion engine 10 is being performed and the opening degree of the WGV 63 is a certain starting opening degree. It is also assumed that the throttle opening degree is the fully open state. From this state, it is assumed that not only the opening degree of the WGV 63 is changed to the fully open state, but also the throttle opening degree is changed to the second opening degree V2, while maintaining the current ignition timing and the current air-fuel ratio of the air-fuel mixture. The absolute value of the reduction in the torque of the internal combustion engine 10 at this time is referred to as a torque reduction value. The torque maps represent relationships between the starting opening degree of the WGV 63 and the torque reduction value. The torque maps are respectively prepared for various combinations of the ignition timing and the air-fuel ratio. In each torque map, basically, the closer the starting opening degree of the WGV 63 is to the fully closed state, that is, the higher the boost pressure QP of intake air is, the larger the torque reduction value becomes. The torque maps are created based on, for example, experiments or simulations.

<Specific Procedure of Avoidance Process>

The CPU 111 starts the avoidance process when the hybrid mode is selected as the drive mode of the vehicle 90, the vehicle speed SP is higher than 0, and the state of charge of the battery 79 is greater than or equal to the specified state of charge. That is, the starting condition of the avoidance process is that the items (N2) and (N3) of the specific condition are met.

Figure 4:
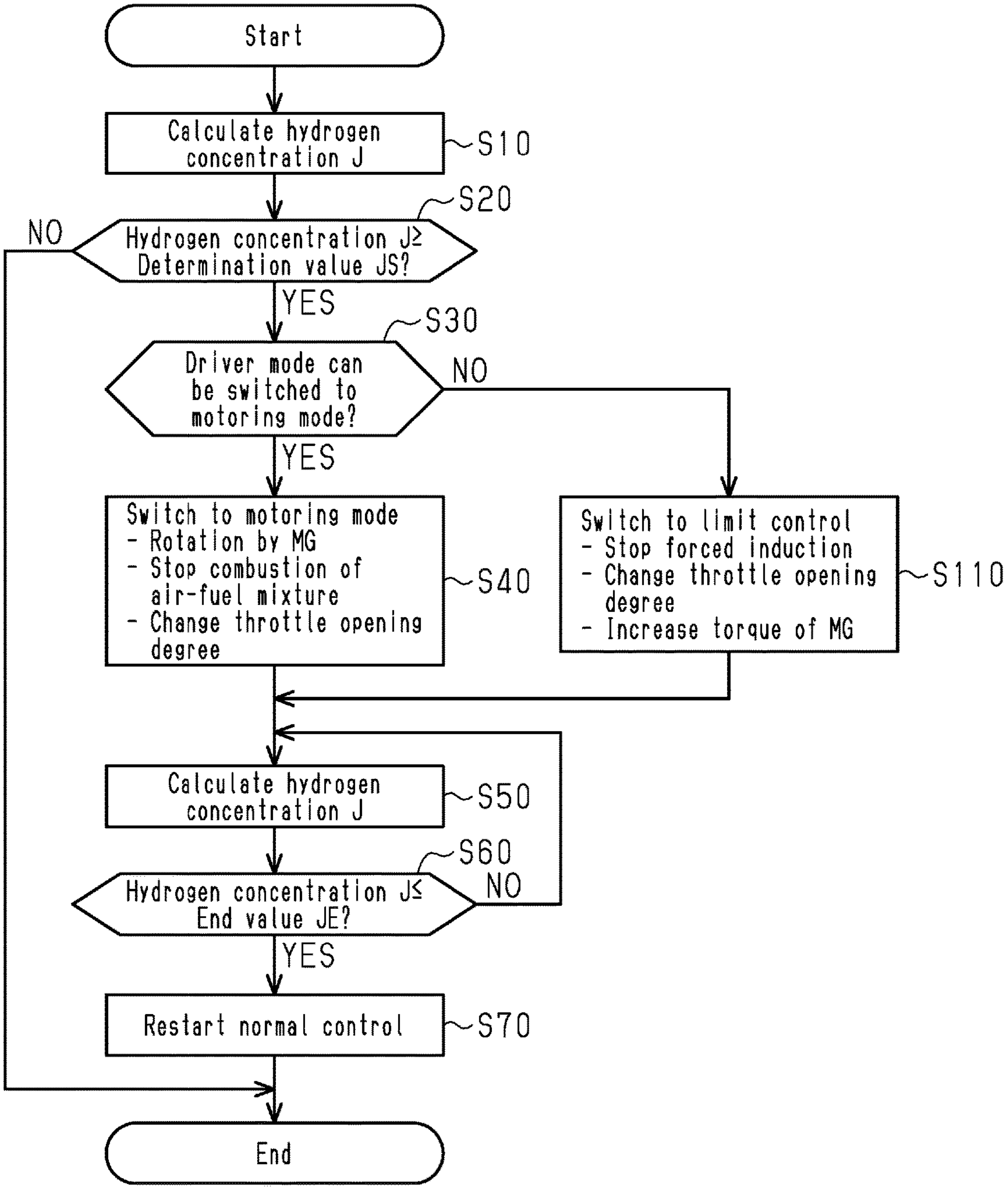
FIG. 4 is a flowchart showing an example of a procedure of an avoidance process in the internal combustion engine shown in FIG. 3.

As shown in FIG. 4, when starting the avoidance process, the CPU 111 first executes the process of step S10. In step S10, the CPU 111 executes the hydrogen concentration calculating process. Specifically, the CPU 111 calculates the latest concentration J received from the concentration sensor 32 as the current hydrogen concentration J in the crank chamber 11. Thereafter, the controller 100 advances the process to step S20.

In step S20, the CPU 111 determines whether the current hydrogen concentration J is greater than or equal to the determination value JS. When the current hydrogen concentration J is less than the determination value JS (step S20: NO), the CPU 111 ends the series of processes of the avoidance process. In this case, if the starting condition is met, the CPU 111 executes the process of step S10 again.

If the current hydrogen concentration J is greater than or equal to the determination value JS in step S20 (step S20: YES), the CPU 111 advances the process to step S30. When the determination in step S20 is YES, the item (N1) of the specific condition is met. Since the item (N2) and the item (N3) are already met, the specific condition is met.

In step S30, the CPU 111 determines whether the drive mode of the vehicle 90 can be switched to the motoring mode. For example, the CPU 111 determines whether the latest required driving force is less than the motoring threshold. When the latest required driving force is less than the motoring threshold, the CPU 111 determines that the drive mode of the vehicle 90 can be switched to the motoring mode (step S30: YES). In this case, the CPU 111 advances the process to step S40.

In step S40, the CPU 111 executes the first reduction process to switch the drive mode of the vehicle 90 to the motoring mode. That is, the CPU 111 stops fuel supply to the cylinders 2 and the ignition in the internal combustion engine 10. As a result, the CPU 111 stops combustion of air-fuel mixture. At the same time, the CPU 111 rotates the crankshaft 7 with the motor-generator 82. Further, the CPU 111 reduces the throttle opening degree, which is currently the fully open state or close to the fully open state, to the first opening degree V1. After performing the first reduction process, the CPU 111 continues the control in the motoring mode. That is, the CPU 111 rotates the crankshaft 7 by rotation of the motor-generator 82 while compensating for the required driving force with the motor-generator 82. Further, the CPU 111 maintains the throttle opening degree at the first opening degree V1. When the CPU 111 shifts to the state of continuing the control in the motoring mode by completing the first reduction process, the CPU 111 advances the process to step S50. Thereafter, CPU 111 continues the control in the motoring mode until step S70.

On the other hand, when it is determined in step S30 that the required driving force is greater than or equal to the motoring threshold (step S30: NO), the CPU 111 advances the process to step S110.

In step S110, the CPU 111 executes the second reduction process and the increase process in order to switch the control in the hybrid mode from the normal control to the limit control. Specifically, the CPU 111 reduces the rotation speed of the compressor wheel 41, which is currently rotating, to 0 by fully opening the WGV 63 in the internal combustion engine 10. As a result, the CPU 111 stops forced induction of the intake air by the compressor wheel 41. Further, the CPU 111 reduces the throttle opening degree, which is currently the fully opened state, to the second opening degree V2. This is the second reduction process. The CPU 111 increases the torque of the motor-generator 82. As a specific process therefor, the CPU 111 performs the following process. First, the CPU 111 identifies the opening degree of the WGV 63 at the point in time when the process proceeds to step S110 as the current starting opening degree. Next, the CPU 111 refers to a torque map that corresponds to the ignition timing and the air-fuel ratio set at the point in time when the process proceeds to step S110. Then, the CPU 111 calculates a torque reduction value that corresponds to the current starting opening degree in the torque map as a corresponding reduction value. Then, the CPU 111 calculates a post-addition torque by adding the corresponding reduction value to the motor target torque at the point in time when the process proceeds to step S110. Then, the CPU 111 controls the motor-generator 82 such that the post-addition torque and the actual torque of the motor-generator 82 agree with each other. This is the increase process. After executing the second reduction process and the increase process, the CPU 111 continues the following process. The CPU 111 controls the internal combustion engine 10 and the motor-generator 82 such that the required driving force is achieved after prohibiting forced induction of the internal combustion engine 10 and setting the upper limit opening degree of the throttle valve 29 to the second opening degree V2. When the CPU 111 shifts to the state of continuing the limit control by completing the second reduction process and the increase process, the CPU 111 advances the process to step S50. Thereafter, CPU 111 continues the limit control until step S70.

In step S50, the CPU 111 calculates the current hydrogen concentration J in the crank chamber 11. The processing contents of step S50 are the same as the processing contents of step S10. After calculating the current hydrogen concentration J, the CPU 111 advances the process to step S60.

In step S60, the CPU 111 determines whether the current hydrogen concentration J is less than or equal to an end value JE. The ROM 112 stores the end value JE in advance. The end value JE is determined in advance through, for example, experiments or simulations as a value at which the hydrogen concentration J in the crank chamber 11 is sufficiently low so that the discharge of hydrogen gas from the crank chamber 11 may be stopped. The end value JE is less than the determination value JS (JE<JS). When the current hydrogen concentration J is greater than the end value JE (step S60: NO), the CPU 111 returns to the process of step S50. Then, the CPU 111 executes the process of step S50 again. That is, the CPU 111 repeats the processes of steps S50 and S60 until the current hydrogen concentration J is less than or equal to the end value JE. When the current hydrogen concentration J is less than or equal to the end value JE (step S60: YES), the CPU 111 advances the process to step S70. The period during which the processes of step S50 and step S60 are repeated is, for example, about 10 seconds.

In step S70, the CPU 111 ends the control in the motoring mode or the limit control, and returns the control of the various parts of the vehicle 90 to the normal control. Thereafter, the CPU 111 controls the vehicle 90 in the hybrid mode, in which the torque of the internal combustion engine 10 is not limited, or in the normal electric mode. Then, the CPU 111 ends the series of processes of the avoidance process. Subsequently, if the starting condition of the avoidance process is met, the CPU 111 executes the process of step S10 again.

During repetition of step S50 and step S60, the vehicle 90 may stop. In this case, the CPU 111 interrupts the avoidance process and executes a vehicle stopping process. In the vehicle stopping process, the CPU 111 continues the motoring mode until the hydrogen concentration J in the crank chamber 11 decreases to the end value JE. That is, when the control in the motoring mode is performed in the avoidance process (S40), the CPU 111 continues the motoring mode. When the limit control is performed in the avoidance process (S110), the mode is shifted to the motoring mode. The CPU 111 rotates the motor-generator 82 at a predetermined rotation speed while continuing the motoring mode in the vehicle stopping process. In the vehicle stopping processing, the CPU 111 disengages the lock-up clutch 84. When executing the vehicle stopping process, the CPU 111 may inform the occupant by, for example, a notification lamp that the rotation of the motor-generator 82 is being continued to discharge hydrogen gas.

Operation of First Embodiment

It is now assumed that the vehicle 90 is traveling in the hybrid mode and forced induction of the internal combustion engine 10 is being performed. When this situation continues for a while, the hydrogen concentration J in the crank chamber 11 increases to the determination value JS (step S20: YES). At this time, it is assumed that the required driving force is so large that the drive mode of the vehicle 90 cannot be switched to the motoring mode (step S30: NO). In such a case, the CPU 111 stops forced induction of the intake air by the compressor wheel 41 and further reduces the throttle opening degree to the second opening degree V2 (step S110). Then, the downstream pressure LP, which has been positive with respect to the atmospheric pressure, becomes negative. At the same time, the downstream pressure LP becomes lower than the pressure RP in the crank chamber 11. Then, the hydrogen gas is discharged from the crank chamber 11 to the downstream passage 3A through the first connecting passage 51.

As another case different from the above-described case, it is assumed that the required driving force is not as large as that in the above-described case when the hydrogen concentration J in the crank chamber 11 increases to the determination value JS, so that the drive mode of the vehicle 90 can be switched to the motoring mode because (step S30: YES). In this case, the CPU 111 causes the motor-generator 82 to rotate the crankshaft 7. Intake air is drawn into the cylinders 2 in accordance with the operation of the pistons 6 caused by the rotation of the crankshaft 7. At the same time, the intake air flows through the intake passage 3. In this situation, the CPU 111 reduces the throttle opening degree to the first opening degree V1. Then, a negative pressure is generated in the downstream passage 3A, and the downstream pressure LP becomes lower than the pressure RP in the crank chamber 11. In particular, since the second opening degree V2 is a considerably small throttle opening degree, the negative pressure of the downstream pressure LP increases (the absolute value of the downstream pressure LP increases), and the difference between the downstream pressure LP and the pressure RP in the crank chamber 11 also increases. Therefore, hydrogen gas is quickly discharged from the crank chamber 11 through the first connecting passage 51.

Advantages of First Embodiment (1-1) As described in the operation section, when the specific condition is met (S20: YES) and the required driving force is considerably large (S30: NO), the CPU 111 sets the downstream pressure LP to a negative pressure by stopping forced induction and changing the throttle opening degree (S110). Thus, hydrogen gas is discharged from the crank chamber 11. In addition, when the downstream pressure LP becomes negative, the pressure of the gas in the cylinders 2 decreases. Accordingly, the amount of hydrogen gas leaking from the cylinders 2 to the crank chamber 11 is reduced. In this manner, hydrogen gas is discharged from the crank chamber 11 and the amount of hydrogen gas newly entering the crank chamber 11 is reduced, so that the hydrogen concentration J in the crank chamber 11 is reduced efficiently. As described above, in the present embodiment, the hydrogen concentration J in the crank chamber 11 is reduced without providing a ventilation fan.

When forced induction is stopped and the throttle opening degree is changed, the torque of the internal combustion engine 10 decreases. The CPU 111 increases the torque of the motor-generator 82 by an amount corresponding to the decrease in the torque of the internal combustion engine 10 in order to compensate for the decrease in the torque (S110). Therefore, the total torque input to the axles 73 from both the internal combustion engine 10 and the motor-generator 82 is maintained at the torque before forced induction is stopped.

(1-2) As described in the operation section, in a case in which the required driving force is limited to a certain magnitude (S30: YES) when the specific condition is met (S20: YES), the CPU 111 sets the drive mode of the vehicle 90 to the motoring mode to cause the downstream passage 3A to become negative (S40). Thus, hydrogen gas is discharged from the crank chamber 11. In addition, when the drive mode of the vehicle 90 is set to the motoring mode, fuel is not supplied to the cylinders 2, and thus hydrogen gas does not enter the crank chamber 11. Therefore, the hydrogen concentration J in the crank chamber 11 is reduced quickly. Further, in the motoring mode, the required driving force is entirely covered by the motor-generator 82, so that the torque input to the axle 73 is maintained.

Figure 2:
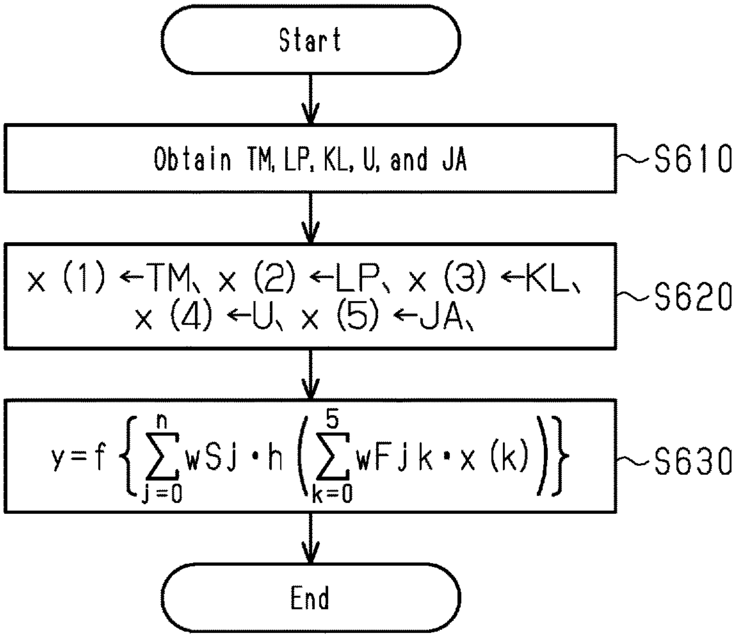
FIG. 2 is a flowchart showing an example of a procedure of a hydrogen concentration calculating process according to a second embodiment of the present disclosure.

A vehicle controller according to a second embodiment of the present disclosure will now be described with reference to FIG. 2. In the second embodiment, the hydrogen concentration calculating process is different from that of the first embodiment. Accordingly, in the second embodiment, the content of the avoidance process is partially different from that of the first embodiment. The internal combustion engine 10 of the second embodiment does not include the concentration sensor 32. Except for these points, the second embodiment is the same as the first embodiment. Hereinafter, in the second embodiment, portions different from those of the first embodiment will be mainly described, and description of contents overlapping with those of the first embodiment will be simplified or omitted.

In the present embodiment, the CPU 111 calculates the hydrogen concentration J in the crank chamber 11 using map data D in the hydrogen concentration calculating process. The storage device 113 stores the map data D in advance. The map data D defines a map that outputs a value of an output variable when the values of the following five input variables are input. The input variables are an operation duration of the internal combustion engine 10 (hereinafter, simply referred to as an operation time) TM, the downstream pressure LP, the engine load factor KL, a cycle injection amount U, and a previous concentration value JA. These input variables are parameters that represent the operating state of the internal combustion engine 10. The output variable is the hydrogen concentration J in the crank chamber 11. The operation time TM is a value that is accumulated from 0 each time the drive mode of the vehicle 90 is switched to the hybrid mode. The cycle injection amount U is a total amount of fuel injection amount supplied to the four cylinders 2 in one combustion cycle. The previous concentration value JA is the hydrogen concentration J calculated in the previous execution of the hydrogen concentration calculating process.

The CPU 111 can execute an obtaining process and a calculating process as part of the hydrogen concentration calculating process. The CPU 111 executes the obtaining process and the calculating process by executing programs stored in the ROM 112. In the obtaining process, the CPU 111 obtains the values of the input variables described above. In the calculating process, the CPU 111 calculates the value of the output variable by inputting the value of each input variable obtained in the obtaining process to the map. In the present embodiment, the CPU 111 repeats the hydrogen concentration calculating process separately from the avoidance process while the hybrid mode is selected. The CPU 111 performs the hydrogen concentration calculating process once per combustion cycle. The CPU 111 stores the calculated hydrogen concentration J in the storage device 113 each time the hydrogen concentration calculating process is executed. The CPU 111 overwrites the old value with the new value. Therefore, the storage device 113 always holds the latest hydrogen concentration J. In step S10 of the avoidance process, the CPU 111 obtains the latest hydrogen concentration J. The same applies to step S50 of the avoidance process.

A specific procedure of the hydrogen concentration calculating process will now be described. As shown in FIG. 2, when starting the hydrogen concentration calculating process, the CPU 111 first executes the process of step S610. In step S610, CPU 111 obtains the values of the input variables. Specifically, the CPU 111 obtains the latest value of the operation time TM, which is calculated separately. Further, the CPU 111 obtains the latest downstream pressure LP received from the intake pressure sensor 36. The CPU 111 also obtains the latest value of the engine load factor KL, which is calculated separately. Further, the CPU 111 calculates the cycle injection amount U based on the fuel injection amount currently set for each of the cylinders 2. This corresponds to the CPU 111 obtaining the cycle injection amount U. Further, the CPU 111 obtains the previous value of the hydrogen concentration J stored in the storage device 113 as the previous concentration value JA. Thereafter, the CPU 111 advances the process to step S620. The process of step S610 is the obtaining process.

In step S620, CPU 111 substitutes the values of the variables obtained in the process of step S610 into input variables x(1) to x(5) to be input to the map, as preprocessing for calculating the hydrogen concentration J using the map of the map data D stored in the storage device 113. Specifically, the CPU 111 substitutes the operation time TM into the input variable x(1). The CPU 111 substitutes the downstream pressure LP into the input variable x(2). The CPU 111 substitutes the engine load factor KL into the input variable x(3). The CPU 111 substitutes the cycle injection amount U into the input variable x(4). The CPU 111 substitutes the previous concentration value JA into the input variable x(5). Thereafter, the CPU 111 advances the process to step S630.

In step S630, the CPU 111 calculates a value of an output variable y by inputting the input variables x(1) to x(5) into the map of the map data D. That is, the CPU 111 calculates the hydrogen concentration J. After calculating the hydrogen concentration J, the CPU 111 overwrites the hydrogen concentration J currently stored in the storage device 113 with the calculated value. The process of step S630 is the calculating process.

The map will now be described in detail. The map according to the present embodiment is configured as a fully-connected feed-forward neural network having one intermediate layer. The neural network includes an input-side coefficient wFjk (j=0 to n, k=0 to 5) and an activation function h(x). An input-side linear map is a linear map defined by the input-side coefficient wFjk. The activation function h(x) is an input-side non-linear map that non-linearly transforms each output of the input-side linear map. In the present embodiment, a hyperbolic tangent tanh(x) is exemplified as the activation function h(x). The neural network includes output-side coefficient wSj (j=0 to n) and an activation function f(x). An output-side linear map is a linear map defined by the output-side coefficient wSj. The activation function f(x) is an output-side non-linear map that non-linearly transforms each output of the out-side linear map. In the present embodiment, a hyperbolic tangent tanh(x) is exemplified as the activation function f(x). The value n indicates the dimension of the intermediate layer. The input-side coefficient wFj0 is a bias parameter and is a coefficient of an input variable x(0). The input variable x(0) is defined as 1. The output-side coefficient wS0 is a bias parameter.

The map is a pre-trained model that has been trained using machine learning before being implemented in the controller 100. In training of the map, multiple learning data sets necessary for training are created in advance. One learning data set includes supervised data and training data. The supervised data is the hydrogen concentration J in the crank chamber 11. The training data includes the operation time TM, the downstream pressure LP, the engine load factor KL, the cycle injection amount U, and the previous concentration value JA. That is, the training data is a set of five variables that are input to the map. In creating the learning data set, experiments or simulations are performed on an internal combustion engine 10 having the same specification as that of the internal combustion engine 10 mounted on the vehicle 90, while variously changing the operating state of the internal combustion engine 10. The internal combustion engine 10 is provided with a concentration sensor 32 that detects the hydrogen concentration J in the crank chamber 11. While the operating state of the internal combustion engine 10 is variously changed in the experiments or simulations, the values of the input variables and the value of the hydrogen concentration J detected by the concentration sensor 32 at each point in time are sequentially obtained. Among the input variables, the previous concentration value JA is the value of the hydrogen concentration J detected by the concentration sensor 32 in the immediately preceding combustion cycle. For such obtained data, a combination of the operation time TM, the downstream pressure LP, the engine load factor KL, the cycle injection amount U, and the previous concentration value JA at a point in time, and the hydrogen concentration J at that point in time are used as one learning data set. A number of such learning data sets are created. When the number of learning data sets necessary for training the map are accumulated, the map is trained by using the learning data sets. That is, for each learning data set, the input-side coefficient and the output-side coefficient of the map are adjusted such that the difference between the value of the hydrogen concentration J, which is output by the map using the training data as an input, and the value of the supervised data is less than or equal to a specified value. When the difference is less than or equal to the specified value, it is determined that the training is completed.

Operation of Second Embodiment

The reason why the above parameters are used as input variables to the map will now be described.

First, the operation time TM will be described. If a state in which hydrogen gas is not discharged from the crank chamber 11 continues during operation of the internal combustion engine 10, the longer the operation time TM, the higher the hydrogen concentration J in the crank chamber 11 can be. The operation time TM is also one piece of information representing the operating state of the internal combustion engine 10, such as the progress of warm-up after the start of the internal combustion engine 10. Taking such information into account when calculating the hydrogen concentration J, the operation time TM is an effective parameter.

Next, the downstream pressure LP will be described. As described in the first embodiment, the opening and closing of the PCV valve 53 is switched according to the magnitude of the downstream pressure LP. As the downstream pressure LP decreases, the amount of hydrogen gas discharged from the crank chamber 11 through the first connecting passage 51 can increase. Such a relationship can be reflected in the map by including the downstream pressure LP as an input variable.

Next, the engine load factor KL will be described. The engine load factor KL is a parameter related to the pressure of the gas in the cylinders 2. As the engine load factor KL increases, the amount of hydrogen gas that enters the crank chamber 11 from the cylinders 2 can increase. Further, if the engine load factor KL is high, the pressure RP in the crank chamber 11 can increase. Therefore, by including both the engine load factor KL and the downstream pressure LP in the input variables, the relationship between the pressure RP in the crank chamber 11 and the downstream pressure LP and the hydrogen concentration J are reflected in the map.

Next, the cycle injection amount U will be described. As the fuel injection amount increases, the hydrogen concentration J in the crank chamber 11 can increase. By using the cycle injection amount U as an input variable, such a relationship is reflected in the map.

Next, the previous concentration value JA will be described. The previous concentration value JA can be a reference value for calculating a new hydrogen concentration J. For example, by including the previous concentration value JA and the downstream pressure LP in the input variables, the hydrogen concentration J output by the map can be a value obtained by decreasing the previous concentration value JA by an amount corresponding to the downstream pressure LP. In addition, for example, by including the previous concentration value JA and the cycle injection amount U in the input variables, the hydrogen concentration J output by the map can be a value obtained by increasing the previous concentration value JA by the fuel injection amount. In this manner, by using the previous concentration value JA as an input variable together with other parameters, it is possible to calculate an accurate hydrogen concentration J reflecting the history of the hydrogen concentration J up to that point.

Advantages of Second Embodiment

In the present embodiment, the hydrogen concentration J is calculated using a map. In this case, if appropriate supervised data and training data are prepared, a map that outputs the hydrogen concentration J with high accuracy can be created. If the hydrogen concentration J can be calculated using a map, the concentration sensor 32 can be omitted.

This mitigates the cost increase associated with the installation of the concentration sensor 32.

Modifications

The above-described embodiments may be modified as follows. The above-described embodiments and the following modifications can be combined as long as the combined modifications remain technically consistent with each other.

The first opening degree V1 is not limited to the example in the above-described embodiments. The first opening degree V1 may be any opening degree that allows the downstream pressure LP to be lower than the pressure RP in the crank chamber 11. The same applies to the second opening degree V2.

In order to reduce the throttle opening degree in the first reduction process (S40), a change amount of the throttle opening degree may be determined in advance instead of determining the target opening degree such as the first opening degree V1. The amount of change in this case may be determined through, for example, experiments or simulations as a value required to cause the downstream pressure LP to be lower than the pressure RP in the crank chamber 11. The same applies to the second reduction process.

It is not essential to stop forced induction of intake air by the compressor wheel 41 in the second reduction process (S110). As long as the downstream pressure LP becomes lower than the pressure RP in the crank chamber 11, the hydrogen gas is discharged from the crank chamber 11 through the first connecting passage 51 even if the forced induction of intake air is continued. Therefore, in the second reduction process, the rotation speed of the compressor wheel 41 may be reduced by a predetermined specified reduction amount without stopping the forced induction. The specified reduction amount may be determined in advance through, for example, experiments or simulations as a reduction amount of the rotation speed of the compressor wheel 41 required to cause the downstream pressure LP to be lower than the pressure RP in the crank chamber 11. Then, the opening degree of the WGV 63 may be changed by an amount required to reduce the rotation speed of the compressor wheel 41 by the specified reduction amount.

In the second reduction process, the rotation speed of the compressor wheel 41 may be reduced discretely. For example, the rotation speed of the compressor wheel 41 is temporarily reduced to a rotation speed higher than 0. Then, when it is difficult for the hydrogen concentration J to decrease even if the rotation speed is maintained at that value for a while, the forced induction may be stopped by setting the rotation speed of the compressor wheel 41 to 0.

The content of the increase process is not limited to the example in the above-described embodiments. In the increase process, the torque of the motor-generator 82 may be increased in accordance with the amount of decrease in the torque of the internal combustion engine 10 in the second reduction process. In this manner, the torque input to the axles 73 is maintained at the same magnitude as before the execution of the second reduction process.

When the torque of the motor-generator 82 is increased in the increase process, it is not essential to compensate for all of the decrease in the torque of the internal combustion engine 10. If the torque of the motor-generator 82 is increased even slightly by the increase process, a decrease in the torque input to the axles 73 is suppressed to some extent.

The content of the limit control is not limited to the example in the above-described embodiments. The content of the limit control may be changed in accordance with the content of the second reduction process. For example, when forced induction is not stopped in the second reduction process as in the above-described modification, the internal combustion engine 10 may be controlled by using, as an upper limit in the forced induction, the rotation speed of the compressor wheel 41 at the end of the second reduction process. Then, the motor-generator 82 may be controlled so as to achieve the required driving force.

The method of determining the end of the control in the motoring mode is not limited to the example in the above-described embodiments. For example, the motoring mode may be ended when a predetermined period of time has elapsed since the start of the motoring mode. In this case, the predetermined period may be set to an appropriate value in consideration of the rate of decrease in the hydrogen concentration J. The same applies to the timing of ending the limit control. The duration until the end may be set to different lengths between the motoring mode and the limit control.

The vehicle stopping process may be omitted. In a light load state of the internal combustion engine 10, the downstream pressure LP may be lower than the pressure RP in the crank chamber 11. Therefore, even if a special process for discharging hydrogen gas is not performed, hydrogen gas is naturally discharged from the crank chamber 11 when the internal combustion engine 10 is started and brought into a light load state at the next traveling of the vehicle 90.

The method of determining the motoring threshold can be changed. As described in the section (1-2) above, in the motoring mode, since fuel supply to the cylinders 2 is stopped, the hydrogen concentration J in the crank chamber 11 can be quickly reduced. If the motoring threshold is set to be as large as possible, the opportunity to switch the drive mode of the vehicle 90 to the motoring mode increases. Thus, it is possible to increase the opportunity to obtain the advantage of the section (1-2). The motoring threshold may be variably set in accordance with the state of charge of the battery 79.

Regarding the motoring mode, it is not essential to stop the combustion of air-fuel mixture in the internal combustion engine 10. That is, in the motoring mode, the crankshaft 7 may be rotated by the motor-generator 82 while the combustion of air-fuel mixture is continued in the internal combustion engine 10. At this time, the internal combustion engine 10 is operated in a state in which the torque output from the internal combustion engine 10 is limited, such as an idling operation. The idling operation means that the internal combustion engine 10 is operated at the minimum engine rotation speed NE at which the internal combustion engine 10 operates independently.

The method of reducing the downstream pressure LP as the pressure reduction process is not limited to the example in the above-described embodiments. That is, the pressure reduction process is not limited to reducing the rotation speed of the compressor wheel 41 or reducing the throttle opening degree. For example, as the pressure reduction process, the valve opening timing of the intake valves 15 may be advanced by the variable intake valve device. When the valve opening timing of the intake valves 15 is advanced, the amount of air taken into the cylinders 2 from the downstream passage 3A in the intake stroke increases, and thus the amount of air in the downstream passage 3A decreases. When the amount of air in the downstream passage 3A decreases, the downstream pressure LP decreases. In view of this point, for example, in the second reduction process of the above-described embodiments, a process of stopping the forced induction by the compressor wheel 41 and advancing the valve opening timing of the intake valve 15 may be executed.

The specific condition is not limited to the example in the above-described embodiments. In many cases, the discharge of the hydrogen gas from the crank chamber 11 is completed quickly. Therefore, the amount of decrease in the state of charge of the battery 79 due to the execution of the motoring mode or the limit control is often small. From this point of view, for example, if the execution time of the motoring mode or the limit control is set to be short in advance, the item (N3) can be omitted. The specific condition may include an item that the hydrogen concentration J in the crank chamber 11 is greater than or equal to the determination value JS.

The method of determining the determination value JS can be changed. The determination value JS may be set to a value at which hydrogen gas needs to be discharged from the crank chamber 11.

When the hydrogen concentration J in the crank chamber 11 is calculated by using a map, parameters used as the input variables of the map are not limited to the examples in the above-described embodiments. As the input variables, other parameters may be employed instead of or in addition to those in the above-described embodiments. For example, the rotation speed of the compressor wheel 41, the boost pressure QP, the engine rotation speed NE, the intake air amount GA, or the like may be employed as the input variables. The number of the input variables may be reduced from the number in the above-described embodiments. Even in a case in which the parameters used as the input variables are changed from the examples in the above-described embodiments, if the downstream pressure LP is included in the input variables, the hydrogen concentration J calculated sufficiently accurately.

When the downstream pressure LP is included in the input variables, a parameter serving as an index of the downstream pressure LP may be employed instead of employing the downstream pressure LP itself as the input variable. For example, the magnitude of the downstream pressure LP may be divided into multiple levels, and values indicating such levels may be used as an input variable.

The output variable does not necessarily need to be the hydrogen concentration J itself. Similarly to the above-described modification, the hydrogen concentration J may be divided into multiple levels, and a value indicating such a level may be used as the output variable. The output variable may be any variable that indicates the hydrogen concentration J.

The configuration of the map is not limited to the example in the above-described embodiments. For example, the number of intermediate layers in the neural network may be two or more.

The method of calculating the hydrogen concentration J is not limited to the example in the above-described embodiments. For example, a map representing the relationship between the hydrogen concentration J and the parameter indicating the operating state of the internal combustion engine 10 may be created. The map is not limited to a table or a graph, and may be a mathematical expression. The method of calculating the hydrogen concentration J may be any method as long as the hydrogen concentration J is calculated based on the operating state of the internal combustion engine 10.

The configuration of the internal combustion engine 10 is not limited to the example in the above-described embodiments. For example, the number of the cylinders 2 may be changed from the number in the above-described embodiments. The fuel injection valves 17 may be changed to a type that supplies fuel to the cylinders 2 via the intake passage 3. The configuration of the forced-induction device 40 may be changed. For example, a variable displacement forced-induction device including a nozzle vane may be employed as the forced-induction device. In this case, when the rotation speed of the compressor wheel is changed to decrease the downstream pressure LP, the opening degree of the nozzle vane may be changed. Further, an electric forced-induction device in which a compressor wheel is rotated by an electric motor may be employed as the forced-induction device. In this case, the rotation speed of the compressor wheel may be changed by changing the rotation speed of the electric motor. It is not essential that the internal combustion engine has a forced-induction device. Even in an internal combustion engine 10 having no forced-induction device, the pressure reduction process can be implemented by changing the throttle opening degree or the like. The configuration of the blow-by gas treatment mechanism may be changed from that in the above-described embodiments. The blow-by gas treatment mechanism may include a connecting passage that connects the crank chamber 11 to the downstream passage 3A. The configuration of the connecting passage is not limited to the example in the above-described embodiments, and may be any configuration as long as it connects the crank chamber 11 and the downstream passage 3A to each other. For example, the connecting passage may extend through the cylinder block 12 and the cylinder head 18. A specific configuration in this case is as follows. The internal combustion engine 10 is provided with a through-hole that is opened in the crank chamber 11 and vertically extending through the cylinder block 12 and the cylinder head 18. An opening of the through-hole on the side opposite to the crank chamber 11 is connected to a gas storage space defined between the cylinder head 18 and the cylinder head cover. The storage space is connected to the downstream passage 3A by a specified passage that passes the outside of the cylinder head cover and reaches the downstream passage 3A. The through-hole, the storage space, and the specified passage may form a connecting passage.

The region for which the hydrogen concentration J is calculated is not limited to the crank chamber 11. The hydrogen concentration J may be calculated for a region including not only the crank chamber 11 but also the connecting passage (51). Further, the hydrogen concentration J may be calculated only for the connecting passage. The hydrogen concentration J may be calculated for only part of the crank chamber 11 or only part of the connecting passage. A region including the entire region of the crank chamber 11 and the entire region of the connecting passage is referred to as a target region. The hydrogen concentration J may be calculated for a certain specific portion of the target region. In the case of the above-described embodiments, the entire region of the crank chamber 11 corresponds to the specific portion.

The overall configuration of the vehicle 90 is not limited to the example in the above-described embodiments. For example, the vehicle may have two motor-generators as drive sources in addition to the internal combustion engine 10. Even in this case, if one of the two motor-generators is used as an axle motor capable of applying torque to the axles, the following can be achieved. If the torque input from the axle motor to the axles is increased when the pressure reduction process is executed, it is possible to suppress a reduction in the torque input to the axles. Further, as described above, in a configuration having two motor-generators as drive sources of the vehicle, if one of the two motor-generators is used as the engine motor capable of applying torque to the internal combustion engine 10, the following is possible. The crankshaft 7 can be rotated by the torque of the engine motor while the combustion of fuel in the internal combustion engine 10 is stopped. As a result, the hydrogen gas can be discharged from the crank chamber 11 in the same manner as in the first reduction process in the above-described embodiments. In a case in which two motor-generators are provided as drive sources of the vehicle, the axle motor and the engine motor may be the same or different.

The vehicle may include only the internal combustion engine 10 as a drive source, but does not necessarily need to include a motor-generator. In such a vehicle, hydrogen gas can be discharged from the crank chamber 11 by reducing the downstream pressure LP by, for example, reducing the throttle opening degree by a predetermined specified opening degree when the hydrogen concentration J becomes high. The specified opening degree may be determined in advance through, for example, experiments or simulations as a reduction amount of the throttle opening degree required to cause the downstream pressure LP to be lower than the pressure RP in the crank chamber 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, the controller comprising a control circuit, wherein the controller is configured to execute a hydrogen concentration calculating process that calculates a hydrogen concentration in a specific portion of a target region based on an operating state of an internal combustion engine, the internal combustion engine using hydrogen as a fuel, a downstream passage being a portion of an intake passage of the internal combustion engine that is downstream of a throttle valve, a connecting passage connecting a crank chamber of the internal combustion engine to the downstream passage, and the target region being a region including the crank chamber and the connecting passage, and a pressure reduction process that, when a condition is met, in which the hydrogen concentration is greater than or equal to a predetermined determination value, causes a pressure in the downstream passage to be lower than that at a point in time when the condition is met, wherein the vehicle includes a motor capable of applying torque to an axle for transmitting driving force to a wheel, and the controller is configured to:

determine whether the latest required driving force is less than a motoring threshold, and in response to the latest required driving force being less than the motoring threshold, switch the drive mode of the vehicle to the motoring mode, in the motoring mode, stop fuel supply to the cylinders and the ignition in the internal combustion engine, rotate the crankshaft with the motor, and reduce the throttle opening degree, and in response to the required driving force being greater than or equal to the motoring threshold, reduce the rotation speed of the compressor wheel, reduce the throttle opening degree, and increase the torque of the motor.

2. The controller for the vehicle according to claim 1, wherein the pressure reduction process is a process that causes an opening degree of the throttle valve to be smaller than that at the point in time when the condition is met.

3. The controller for the vehicle according to claim 1, wherein the internal combustion engine includes a compressor wheel that performs forced induction of intake air on an upstream side of the throttle valve in the intake passage, and the pressure reduction process is a process that causes a rotation speed of the compressor wheel to be lower than that at the point in time when the condition is met.

4. The controller for the vehicle according to claim 3, wherein the pressure reduction process is a process that stops forced induction of the intake air by the compressor wheel and causes an opening degree of the throttle valve to be smaller than a fully open state.

5. The controller for the vehicle according to claim 1, wherein the vehicle includes a motor capable of applying torque to an axle for transmitting driving force to a wheel, and the control circuit is configured to cause, when executing the pressure reduction process, the torque input to the axle from the motor to be greater than that at the point in time when the condition is met.

6. The controller for the vehicle according to claim 1, wherein the vehicle includes a motor capable of applying torque to a crankshaft of the internal combustion engine, and the pressure reduction process is a process that rotates the crankshaft with the torque of the motor and causes an opening degree of the throttle valve to be smaller than that at the point in time when the condition is met.

7. The controller for the vehicle according to claim 1, wherein the control circuit includes a storage device and an execution device, the storage device stores in advance map data defining a map pre-trained through machine learning, the map outputting a variable indicating the hydrogen concentration as an output variable when multiple input variables are input to the map, the map includes, as one of the input variables, a variable indicating a pressure in the downstream passage, the execution device is configured to execute the following as the hydrogen concentration calculating process:

an obtaining process that obtains values of the input variables; and a calculating process that calculates a value of the output variable by inputting the values of the input variables, which are obtained by the obtaining process, to the map.

8. A control method for a vehicle, the method being executed by a controller including a control circuit, the method comprising:

calculating a hydrogen concentration in a specific portion of a target region based on an operating state of an internal combustion engine, the internal combustion engine using hydrogen as a fuel, a downstream passage being a portion of an intake passage of the internal combustion engine that is downstream of a throttle valve, a connecting passage connecting a crank chamber of the internal combustion engine to the downstream passage, and the target region being a region including the crank chamber and the connecting passage, and when a condition is met, in which the hydrogen concentration is greater than or equal to a predetermined determination value, causing a pressure in the downstream passage to be lower than that at a point in time when the condition is met, wherein the vehicle includes a motor capable of applying torque to an axle for transmitting driving force to a wheel, and the method further comprises:

determining whether the latest required driving force is less than a motoring threshold, when the latest required driving force is less than the motoring threshold, the drive mode of the vehicle is switched to the motoring mode, in the motoring mode, stopping fuel supply to the cylinders and the ignition in the internal combustion engine, rotating the crankshaft with the motor, and reducing the throttle opening degree, when the required driving force is greater than or equal to the motoring threshold, reducing the rotation speed of the compressor wheel, reducing the throttle opening degree, and increasing the torque of the motor.

9. A non-transitory computer readable medium that stores a program that causes a processor to execute a control process, wherein the control process includes:

calculating a hydrogen concentration in a specific portion of a target region based on an operating state of an internal combustion engine, the internal combustion engine using hydrogen as a fuel, a downstream passage being a portion of an intake passage of the internal combustion engine that is downstream of a throttle valve, a connecting passage connecting a crank chamber of the internal combustion engine to the downstream passage, and the target region being a region including the crank chamber and the connecting passage, and when a condition is met, in which the hydrogen concentration is greater than or equal to a predetermined determination value, causing a pressure in the downstream passage to be lower than that at a point in time when the condition is met, wherein the vehicle includes a motor capable of applying torque to an axle for transmitting driving force to a wheel, and the control process further comprises:

determining whether the latest required driving force is less than a motoring threshold, when the latest required driving force is less than the motoring threshold, the drive mode of the vehicle is switched to the motoring mode, in the motoring mode, stopping fuel supply to the cylinders and the ignition in the internal combustion engine, rotating the crankshaft with the motor, and reducing the throttle opening degree, when the required driving force is greater than or equal to the motoring threshold, reducing the rotation speed of the compressor wheel, reducing the throttle opening degree, and increasing the torque of the motor.

10. The controller for the vehicle according to claim 1, wherein the controller is configured to calculate the hydrogen concentration by obtaining (i) a latest value of an operation time, (ii) a latest downstream pressure, (iii) a latest value of an engine load factor, (iv) a cycle injection amount based on a fuel injection amount currently set for each cylinder, and (v) a previous hydrogen concentration value.

11. The controller for the vehicle according to claim 10, wherein the controller is configured to calculate the hydrogen concentration using an equation $$y = f\left\{\sum_{j=0}^{n} wSJ \cdot h\left(\sum_{k=0}^{5} wFjk \cdot x(k)\right)\right\},$$

wherein y is the hydrogen concentration, wFjk is an input-side coefficient with j equal to 0 to n and k equal to 0 to 5, h(x) is an input-side non-linear map that non-linearly transforms each output of an input-side linear map, wSj is an output-side coefficient with j equal to 0 to n, f(x) is an output-side non-linear map that non-linearly transforms each output of an output-side linear map, n indicates a dimension of an intermediate layer, and x(k) is an input variable where x(1) is the latest value of the operation time, x(2) is the latest downstream pressure, x(3) is the latest value of the engine load factor, x(4) is the cycle injection amount, and x(5) is the previous hydrogen concentration value.

* * * * *